US005224254A

United States Patent [19]

McPeak et al.

[11] Patent Number: 5,224,254

[45] Date of Patent: Jul. 6, 1993

[54] PULLER

[75] Inventors: Thomas J. McPeak, Owatonna; James C. Solie, Faribault; John R. Loquai, Owatonna, all of Minn.

[73] Assignee: Power Team Division of SPX Corporation, Owatonna, Minn.

[21] Appl. No.: 899,716

[22] Filed: Jun. 17, 1992

[51] Int. Cl.$^5$ .......... B23P 19/04

[52] U.S. Cl. .......... 29/261

[58] Field of Search .......... 29/261, 262, 246

[56] References Cited

U.S. PATENT DOCUMENTS

| | | | |
|---|---|---|---|
| 1,470,310 | 10/1923 | Winchell | 29/261 |
| 1,552,616 | 9/1925 | Kister | 29/261 |
| 1,584,855 | 5/1926 | Eisenhuth . | |
| 1,682,956 | 9/1928 | Dawson et al. | 29/261 |
| 1,709,913 | 4/1929 | Kaplan . | |
| 1,715,506 | 6/1929 | Livesay . | |
| 1,777,616 | 10/1930 | Hommel . | |
| 1,794,494 | 3/1931 | Noble . | |
| 2,024,891 | 12/1935 | Spuler et al. . | |
| 2,262,969 | 11/1941 | Schultz . | |
| 4,007,535 | 2/1977 | Brandt et al. . | |
| 4,068,365 | 1/1978 | Brandt et al. . | |
| 4,084,305 | 4/1978 | Chang . | |
| 4,117,581 | 10/1978 | Brodie . | |
| 4,649,615 | 3/1987 | Hundley . | |
| 4,706,357 | 11/1987 | Ewing . | |

OTHER PUBLICATIONS

*SCHREM Solves your Pulling Problems* brochure.

*POSI LOCK Gear & Bearing Puller,* 1991 catalog, p. 3.

*Primary Examiner*—Robert C. Watson
*Attorney, Agent, or Firm*—Wood, Phillips,Van Santen, Hoffman & Ertel

[57] ABSTRACT

A puller for removing an object from a shaft including first and second collars movable relative to one another along an axis, at least two circumferentially spaced clamping jaws pivotally supported at one end to the first collar and having means at the other end for grasping the object, at least two circumferentially spaced links, each of the links being pivotally supported at one end to the second collar and pivotally supported at the other end to an associated clamping jaw, and a drive structure for moving the collars together along the axis away from the shaft. A threaded rod is fixed to the second collar, and a nut receives the threaded rod and is secured against axial movement toward the shaft relative to the first collar. The nut may be turned to move the threaded rod and second collar axially relative to the first collar. The clamping jaws may include bidirectional claws for selective use, with the collars and links being positionable to permit the axial spacing from the first collar to be selectively less than or greater than the axial spacing between the collars. An axially extending pusher is secured to one of the collars and has an end engageable with an end of the shaft. Either manual or hydraulic cylinder drives, or a combination thereof, biases the pusher relative to the collars for removal of a grasped object from an engaged shaft.

19 Claims, 4 Drawing Sheets

Fig. 1
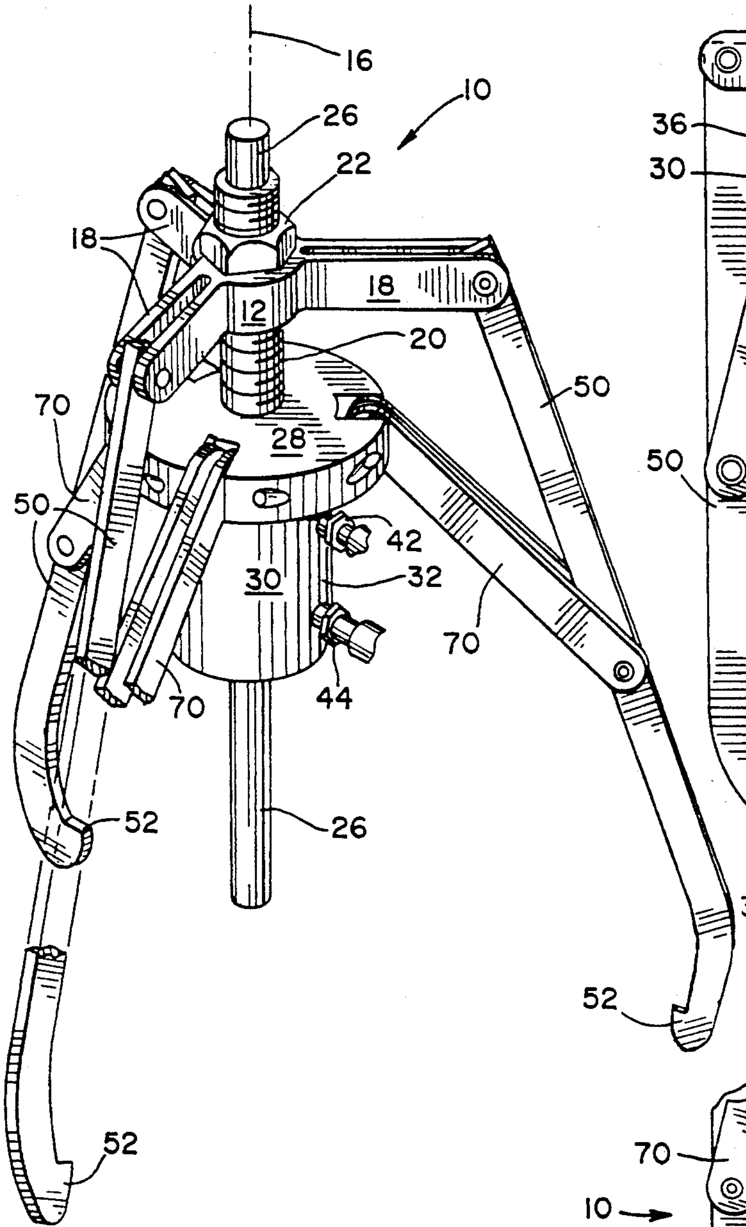
Fig. 2
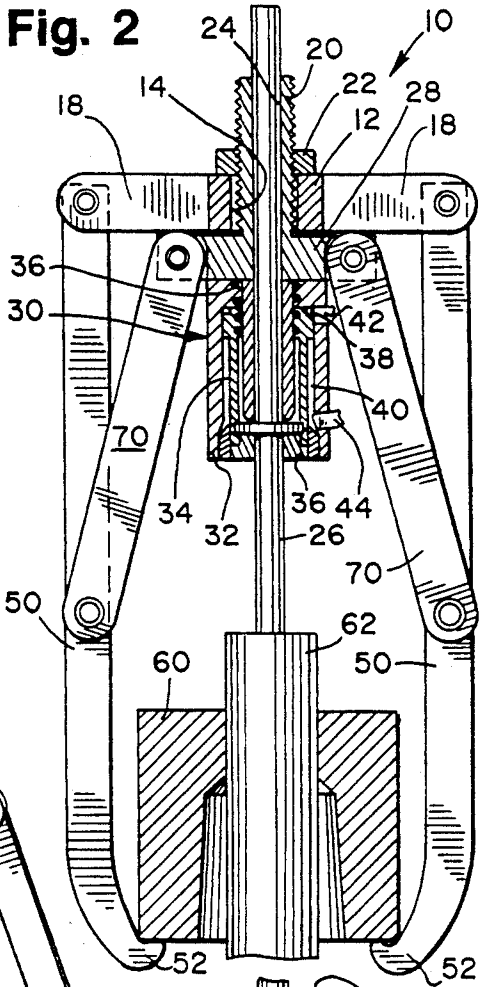
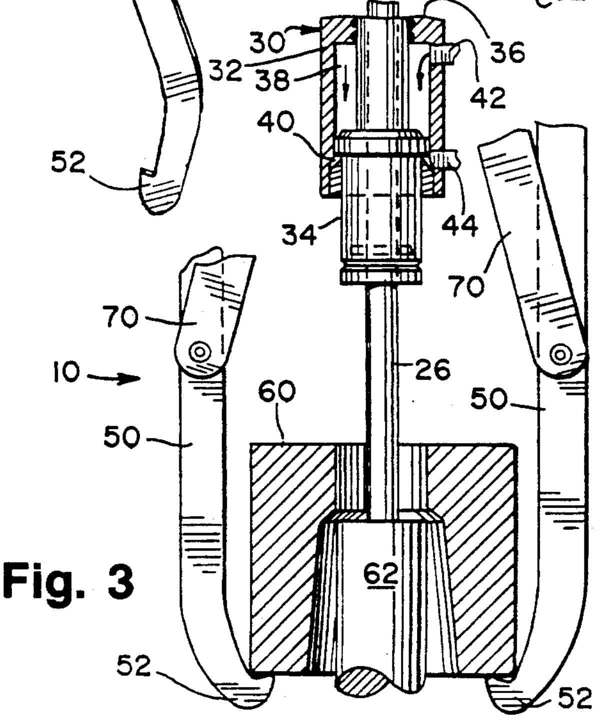
Fig. 3

Fig. 4
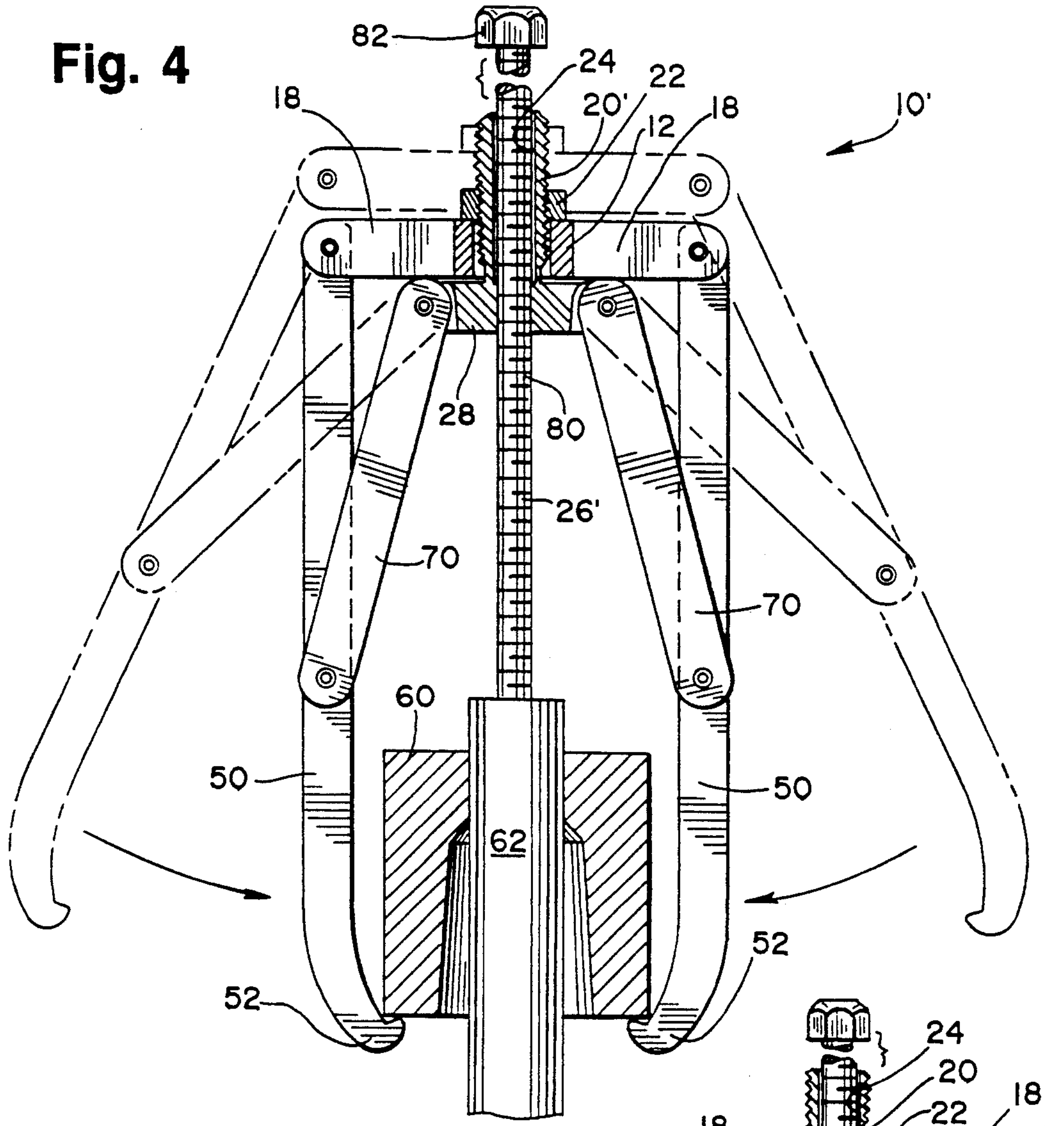
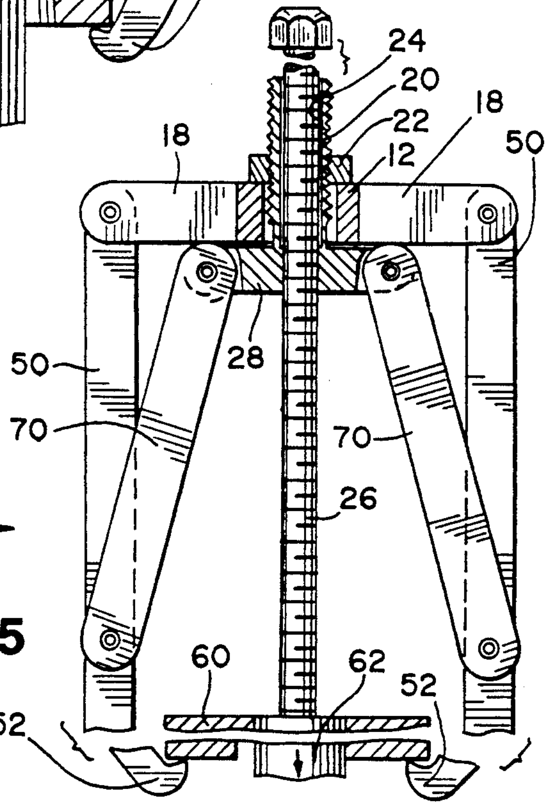
Fig. 5

Fig. 6
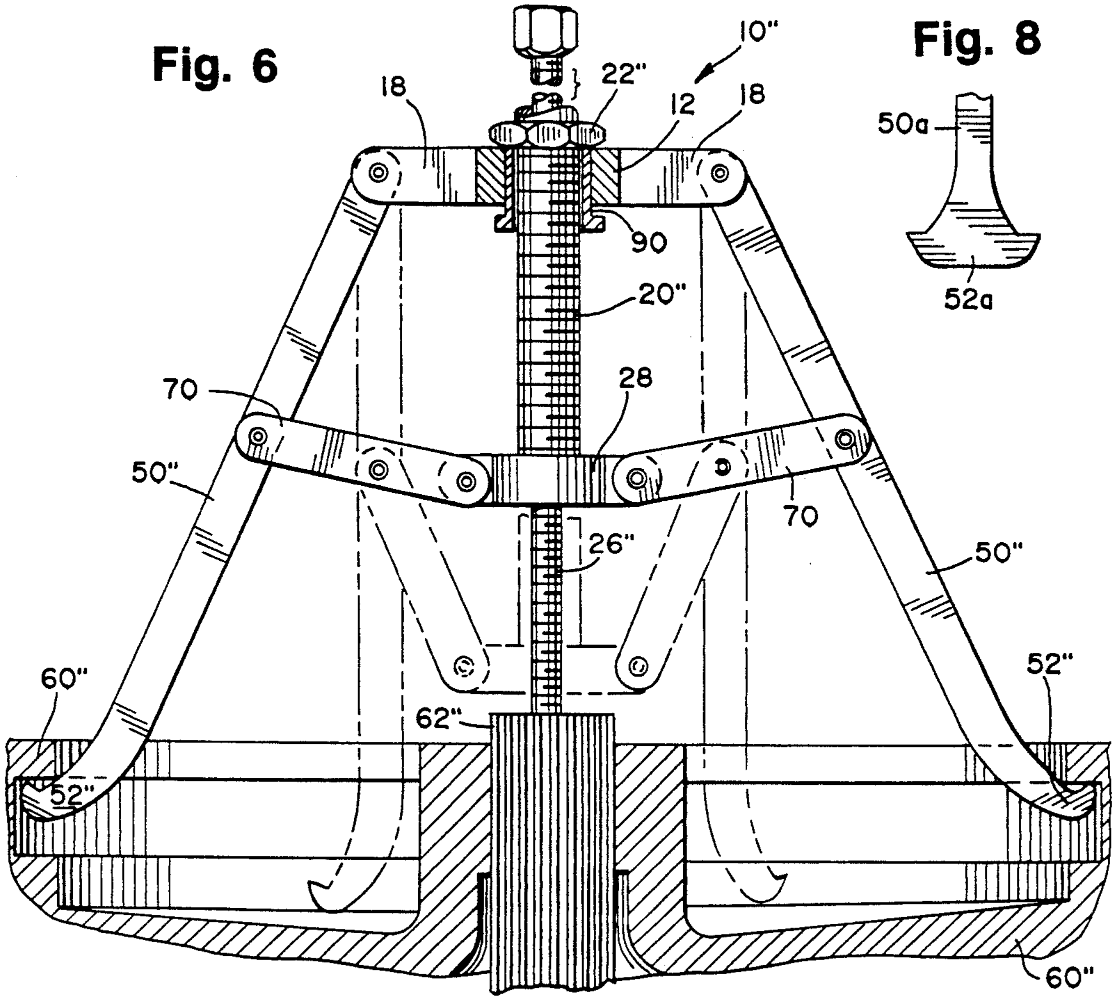
Fig. 8
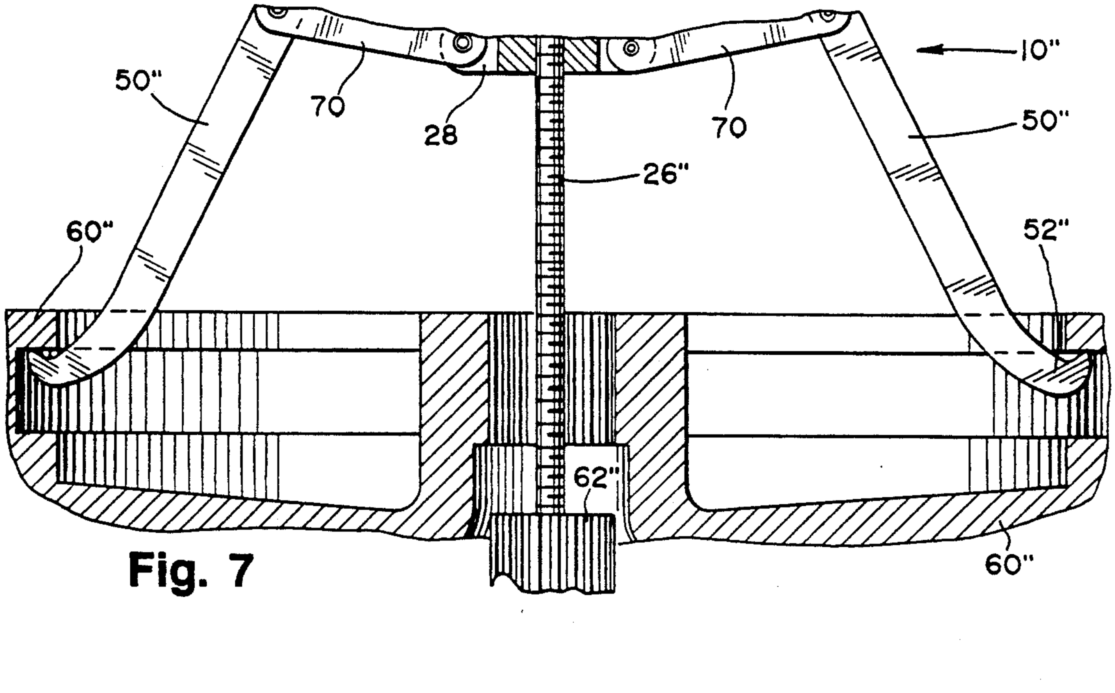
Fig. 7

PULLER

BACKGROUND OF THE INVENTION

1. Technical Field

The present invention is directed toward pullers, and more particularly toward pullers usable in removing an object from a shaft.

2. Background Art

Pullers used in grasping an object secured to a shaft and pulling the object off of the shaft are known in the art. Typically, such pullers include a plurality of clamped jaws which are located about the object with grasping ends of the jaws engaging the object to be removed from the shaft. A central pusher element will be driven against the end of the shaft to pull the jaws and clamped object over and off of the shaft.

For example, one type of such structure which has been widely used has manually positionable jaws which are maintained in position grasping an object principally by the frictional forces generated at their grasping ends by the stresses of pulling. Such structures have included jaws which are pivotally supported at an intermediate point with the non-grasping end bearing against a shoulder. Other such structures have included jaws pivoted at one end with a plurality of intermediate links manually adjustable by moving a central link collar to locate the jaws. However, the jaws in such structures can slip during use, such slipping being a significant disadvantage in several respects. First, slipping of the puller obviously results in wasted time and general inefficiency of use. Also, due to the large forces typically being applied when pulling an object tightly wedged on a shaft, slipping during use can result in backlash with obvious danger to the individual operating the puller. Still further, such backlash can damage not only the puller itself, but also the object being removed from the shaft. Of course, damage to the object being removed can leave it in a condition in which it is much more difficult to finish removing it from the shaft.

Other such structures which have been used include a separate clamp which physically connects the jaws together at a selected position. However, such structures are not readily usable with large pullers or with pullers having more than two jaws.

Still another structure which has been used has been to provide a cage around the outside of the jaws to restrain their outward movement. Such pullers are shown, for example, in U.S. Pat. Nos. 4,007,535 and 4,068,365. Of course, such pullers can only be used in removing objects which can be grasped around their outer perimeter. Further, the cages of such pullers have been found to be susceptible to breaking when they are subjected to high forces, particularly when such structures are used with larger objects (relative to the puller size) due to the large stresses resulting from the geometry of the puller. Still further, while such jaws are generally retained against completely slipping off of the object being grasped, the jaws are nevertheless susceptible to some amounts of slipping. As previously described, such slipping can have numerous undesirable effects, including damage to the object, damage to the puller, and injury to the operator.

The present invention is directed toward overcoming one or more of the problems set forth above.

SUMMARY OF THE INVENTION

In one aspect of the present invention, a puller for removing an object from a shaft is provided including first and second collars movable relative to one another along an axis, at least two circumferentially spaced clamping jaws pivotally supported at one end to the first collar and having means at the other end for grasping the object, at least two circumferentially spaced links, each of the links being pivotally supported at one end to the second collar and pivotally supported at the other end to an associated clamping jaw, and means for moving the collars together along the axis away from the shaft.

In another aspect of the present invention, a threaded rod is fixed to the second collar, and a nut receives the threaded rod and is secured against axial movement toward the shaft relative to the first collar. The nut may be turned to move the threaded rod and second collar axially relative to the first collar.

In still another aspect of the present invention, the axial spacing between the first collar and the other end pivotal support of the links is greater than the axial spacing between the collars. In an alternative aspect of the invention, the axial spacing between the first collar and the other end pivotal support of the links is less than the axial spacing between the collars. In still another alternative aspect of the present invention, the clamping jaws include bidirectional claws for selective use with the collars and links being positionable to permit the axial spacing from the first collar to be selectively less than or greater than the axial spacing between the collars.

In yet another aspect of the present invention, an axially extending pusher is secured to one of the collars, with the pusher having an end engageable with an end of the shaft. The pusher may be biased either by interaction of a threaded surface about the pusher and received within a threaded opening fixed relative to the second collar, where the pusher includes an irregular surface which is engageable by a tool for turning, or alternatively by a hydraulically operated cylinder, where the stroke length of the cylinder may be effectively extended by adjustably securing the cylinder to the pusher by a threaded interconnection.

It is an object of the present invention to provide a puller which may be easily and inexpensively manufactured.

It is a further object of the present invention to provide a puller which may be easily and inexpensively used.

It is another object of the present invention to provide a puller which operates reliably with minimal danger of injuring the operator.

It is still another object of the present invention to provide a puller which may be operated with minimal risk of being damaging.

It is a still further object of the present invention to provide a puller which may be easily and inexpensively repaired even if damaged.

It is yet another object of the present invention to provide a puller which may be operated with minimal risk causing undesirable damage to the object being removed from the shaft.

Another object of the present invention is to provide a puller which maintains and even increases its grip on the object as it is removed from a shaft.

Still another object of the present invention is to provide a puller which may readily be used on a wide variety of sizes of objects to be removed from shafts.

Yet another object of the present invention is to provide a puller which may readily be used not only to remove objects which must be grasped about their outer periphery but also to remove objects which must be grasped on their inner periphery.

BRIEF DESCRIPTION OF THE DRAWINGS

FIG. 1 is a perspective view of a hydraulically operated embodiment of the present invention;

FIG. 2 is a cross-sectional view of a hydraulic operated embodiment of the present invention showing the puller in a first position during the removal of an object from a shaft;

FIG. 3 is a broken cross-sectional view similar to FIG. 2 showing the puller in the final stages of removal of the object from the shaft;

FIG. 4 is a cross-sectional view of a manually operated embodiment of the present invention showing the positions of the puller as it grasps an object to be removed from a shaft;

FIG. 5 is a broken cross-sectional view similar to FIG. 4 showing the puller in the final stages of removal of the object from the shaft;

FIG. 6 is a cross-sectional view of yet another embodiment of the present invention showing the positions of the puller as it grasps an object on its inner periphery for removal from a shaft;

FIG. 7 is a broken cross-sectional view similar to FIG. 6 showing the puller in the final stages of removal of the object from the shaft;

FIG. 8 is a partial view of the claw end of a bidirectional jaw usable with yet another embodiment of the present invention;

DESCRIPTION OF THE PREFERRED EMBODIMENT

Figure 9:
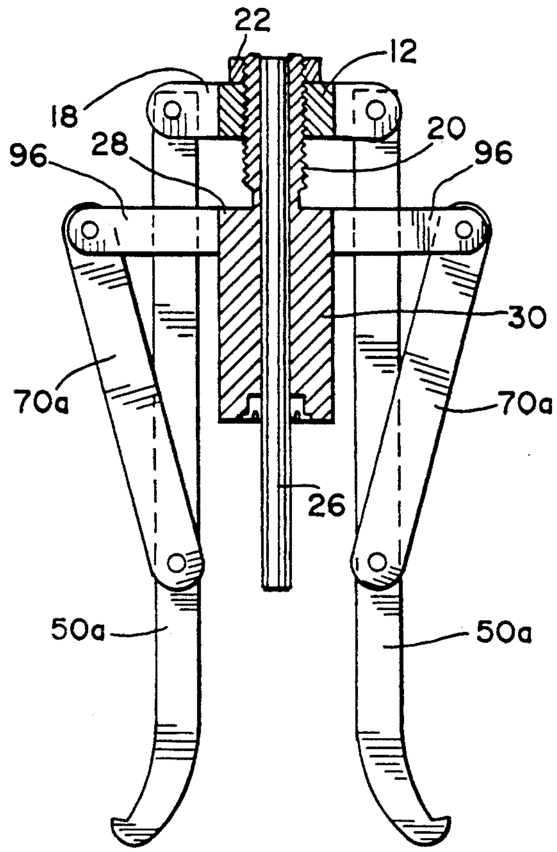
FIG. 9 is a cross-sectional view of still another embodiment of the present invention showing the puller in a first position prior to grasping an object on its inner periphery for removal from a shaft.

A first embodiment of the puller 10 of the present invention is shown in FIGS. 1-3. The puller 10 includes a top collar 12 having a central opening 14 which is generally cylindrical about an axis 16. (It should be noted that references herein to "top", "bottom", "above", "below", etc. are for ease of reference in describing the puller 10 as oriented in the figures. It should be understood that the puller 10 as used may actually have different orientations depending on the orientation of the shaft from which the object is to be removed.) The top collar also has three radial arms 18 having an even circumferential spacing, that is, a 120 degree spacing between one another.

A threaded rod 20 extends through the top collar opening 14 and is suitably secured thereto by a nut 22. The nut 22 is preferably secured to the top collar 12 so that it may move axially relative to the collar 12 at least a limited amount. Further, not shown in FIGS. 1-3 but described hereafter in reference to the FIGS. 6-7 embodiment, it is preferred in this and other embodiments that the movement of the nut 22 relative to the top collar 12 be suitably limited to thereby limited the amount of axial biasing force translated radially to the arms 18, as will become apparent. However, it is within the scope of at least one aspect of the present invention that the nut 22 be simply disposed above the top collar 12 so as to limit only the downward movement of the threaded rod 20 relative to the top collar 12.

The threaded rod 20 also includes a central opening 24 therethrough receiving a pusher 26 as described in greater detail hereafter.

Secured to the bottom of the threaded rod 20 in the embodiment shown in FIGS. 1-3 is a plate or collar 28 beneath which is secured a suitable drive cylinder 30 for the pusher 26. While any number of cylinders 30 would be suitable for use with this embodiment of the present invention, it has been found that a hollow center cylinder 30 such as shown is particularly suitable as will become apparent.

In particular, the hollow center cylinder 30 shown includes a cylinder body 32, a hollow piston 34, suitable seals 36 defining separate upper and lower chambers 38, 40 between the body 32 and piston 34, and upper and lower ports 42, 44 communicating with the upper and lower chambers 38, 40 respectively. Fluid is introduced through the upper port 42 into the upper chamber 38 to drive the piston 34 down (see FIG. 3), with fluid in the lower chamber 40 being discharged out the lower port 44. The operating fluid is preferably hydraulics, particularly for larger size pullers 10 where great force may be required to remove the object from the shaft. However, still other drive fluids, such as pneumatics, could also be used in some applications of this embodiment of the present invention.

The pusher 26 thus extends through the rod central opening 24 and the hollow piston 34 and is suitably secured to the piston 34. Preferably, the pusher 26 is adjustably secured to the piston 34, as by a threaded connection, so that the pusher 26 can be rotated to adjust its extension below the piston 34. In this manner, a cylinder 30 having a shorter stroke length (and therefore generally lower cost) can be used and still accommodate removal of objects over long axial lengths of a shaft as will become apparent hereafter.

Clamping jaws 50 having grasping claws 52 at their lower ends are pivotally secured at their upper ends to each of the top collar radial arms 18.

In the embodiment shown in FIGS. 1-3, the puller 10 is usable to remove an object 60 secured to a shaft 62 about the inner periphery of the object 60. Therefore, the grasping claws 52 are directed radially inwardly toward the central axis 16 of the puller 10 so that the jaws 50 may be disposed about the outer periphery of the object 60 with the claws 52 projecting inwardly to engage a bottom shoulder of the object 60.

Links 70 are pivotally secured at one end to an intermediate point on an associated jaw 50 and on their other end to the plate 28 of the cylinder 30, and are circumferentially aligned with the associated jaws 50 so that both the jaws 50 and the links 70 will move substantially in planes which intersect at the puller axis 16. Still further, in the FIGS. 1-3 embodiment, the axial spacing between the top collar 12 and the plate 28 is, during use, less than the axial spacing between the top collar 12 and the pivotal connection of the jaws 50 and links 70 for a reason which will become apparent hereafter.

As will be recognized by those of skill in this art once an understanding of the present invention is obtained, the puller 10 requires at least two jaws 50, although three and more jaws 50 could also be used. However many jaws 50 are provided, it is generally preferable that they be evenly spaced circumferentially, although different spacings could be used within the scope of the present invention.

Operation of the FIGS. 1–3 embodiment is thus as follows. Where it is desired to remove the object 60 from the shaft 62 on which it is wedged or otherwise secured, the puller 10 is first positioned with its jaws 50 about the object 60 with its claws 52 adjacent a shoulder on the object 60 which may be grasped.

The nut 22 is then tightened to draw the plate 28 toward the top collar 12. This movement causes the links 70 to pull the jaws 50 inwardly until the jaw claws 52 are suitably positioned securely grasping the object 60.

At this point, the pusher 26 may be adjusted relative to the piston 34 as previously described until its lower end engages the top of the shaft 62. The piston 34 then be suitably driven (e.g., by introducing hydraulic pressure into the upper chamber 38) to bias the entire puller 10 and grasped object 60 upwardly and off of the shaft 62 as shown in FIG. 3.

Of course, depending on the object 60 and shaft 62, different sequences of operation of the cylinder 30 could also be used. For example, in some situations it might not be necessary to initially adjust the pusher 26 relative to the piston 34. Alternatively, in other situations a single stroke of the piston 34 may not be adequate to completely remove the object 60. In such cases, the piston 34 can be extended completely a first time to partially remove the object 60 from the shaft 62, and then the piston 34 can be retracted upward while the pusher 26 is adjusted downward, after which the piston 34 may be driven again to further remove the object 60. This sequence can be repeated as many times as necessary to remove the object 60 from the shaft 62. While such a sequence is slightly more time consuming than a single cycle of the cylinder 30, such operation does allow for use of both shorter stroke cylinders 30 and shorter jaws 50 (since longer cylinders 30 generally require correspondingly longer jaws 50 in order to allow adequate axial spacing between the cylinder end and the jaw claws 52. Of course, both of these features will generally allow the puller 10 to be manufactured at less cost.

It should be appreciated from the above that, during the pulling operation, the biasing force on the cylinder 30 will be up whereas the reactive force on the top collar 12 will be down. Thus, the forces which exist during pulling bias the top collar 12 and the plate 28 together, with the extremely advantageous result being that the links 70 apply an additional biasing force pulling the jaws 50 inward. In short, the greater the forces required to pull the object 60 from the shaft 62, the greater will be the gripping force on the jaws 50 to ensure, at the most critical moment when the most damage and/or injury can be done, that they do not slip from the object 60.

FIGS. 4–5 disclose a second embodiment of the invention similar to the FIGS. 1–3 embodiment, except that a manual drive is provided. Therefore, in describing this embodiment, components which are the same in both embodiments are identified by the same reference numerals, and comparable but modified components are identified by the same reference numerals but with prime ("'") added for the FIGS. 4–5 embodiment.

More specifically, the FIG. 4–5 embodiment does not include a cylinder 30 disposed beneath the plate 28, and instead includes a threaded opening 80 in the plate 28. The pusher 26' has a matching outer thread and a suitable hexagonal head 82 or the like. The head 82 is engaged by a suitable tool (not shown) such as a wrench which may be pivoted to rotate the pusher 26' and thereby drive the pusher 26' down against the end of the shaft 62 and bias the remainder of the puller 10' up to remove the object 60.

Other than the different drive structure, it will be recognized that the FIGS. 4–5 embodiment will operate the same as, and thereby provide the same significant advantages as, the first described FIGS. 1–3 embodiment.

FIGS. 6–7 disclose a third embodiment of the invention having some clear similarities to the previously described embodiments. Therefore, in describing this embodiment, components which are the same as in the previously described embodiments are identified by the same reference numerals, and comparable but modified components are identified by the same reference numerals but with double prime ("''") added in reference to the FIGS. 6–7 embodiment.

More specifically, the FIGS. 6–7 embodiment is usable to remove objects which must be grasped from their inner periphery for removal, such as the object 60'' illustrated on the shaft 62'' in FIGS. 6–7.

In order to accommodate such operation, the plate 28 is disposed lower on the pusher 26'' so as to orient the links 70 in the opposite direction than that shown in the FIGS. 1–5 embodiments. Specifically, the axial spacing between the top collar 12 and the plate 28 is, during use, greater than the axial spacing between the top collar 12 and the pivotal connection of the jaws 50 and links 70.

As a result of this different orientation, movement of the plate 28 toward the top collar 12 causes the links 70 to push the jaws 50'' outwardly. Thus, the jaws 50'' include outwardly oriented grasping claws 52'' for this different type of operation.

It should thus now be recognizable that the FIGS. 6–7 embodiment will operate in much the same manner as the previously described embodiments, except that it will grasp objects 60'' from their inner periphery where necessary.

That is, from the initial position shown in phantom in FIG. 6 with the jaws 50'' drawn together by the links 70, the nut 22 is manually rotated to pull the threaded rod 20'' up. This moves the top collar 12 and the plate 28 together to thereby cause the links 70 and jaws 50'' to interact to push the jaws 50'' out into engagement with the object 60'' (contrast the phantom and actual positions shown in FIG. 6). Once the object 60'' is suitably grasped by the jaws 50'', the pusher 26 may be rotated as with the other embodiments to pull the top collar 12, plate 28, links 70 and jaws 50'' up together with the grasped object 60''.

Again, it should be appreciated that the biasing force of the pusher 26 is applied directly to the plate 28 and therefore tends to further bias the plate 28 and top collar 12 together to increase the grasping force (by applying a further outward biasing force on the jaws 50'' through the links 70) during removal of an object 60''.

As mentioned previously with respect to the FIGS. 1–3 embodiment, in form, the nut 22'' may be secured to the top collar 12 so that it may move axially relative to the collar 12 a limited amount. One structure for accomplishing this is shown in FIG. 6. Specifically, the nut 22'' includes a groove 90 in its outer surface which receives the top collar 12 (or a suitable tongue of the collar 12), where the groove 90 has a greater axial dimension than the portion of the collar 12 received therein (greater from small amounts such as a fraction of an inch, up to essentially unlimited amounts depending on the strength of the jaws 50″).

When pulling an object with a puller 10″ which includes such a nut 22″, the biasing force of the pusher 26″ will thus increase the grasping force by biasing the plate 28 and top collar 12 together as previously described. However, the nut 22″ will limit the actual amount which the plate 28 and collar 12 will be moved together to ensure that the axial pulling force does not also result in excessive radial grasping force on the jaws 50″.

Still further, it should be understood that an operator could periodically tighten the nut 22″ during pulling if the top of the nut 22″ is not abutting the top collar 12 (as should be visually recognizable). By doing so, the operator can ensure that the grasping force will not be abruptly lowered (perhaps undesirably releasing the grasped object 60″) should the pulling force be abruptly lowered, as typically will occur when the object 60″ breaks whatever binds it may have had with the shaft 62″.

Similarly, it should be recognized that such a structure can be used to simplify the initial grasping steps. That is, particularly with pullers having a hydraulic drive such as shown in FIGS. 1-3, the operator may loosely position the jaws in a grasping position, and then use the cylinder to apply a further force which will initially increase the grasping force by unseating the nut 22″ and move the plate 28 and top collar 12 together. At that point, it is much easier for the operator to manually rotate the nut 22″ to again reseat it on the collar 12 (and thereby secure the puller to the object with that increased grasping force).

Of course, it should also be understood that a single puller could be made which would permit objects to be drawn off of a shaft 62 by grasping on either the inner or outer periphery of the object, depending on the shape of the object. In such a case, a puller 10″ such as shown in FIGS. 6-7 could be used, with the nut 22 being usable to adjust the plate 28 to properly orient the links 70 depending on the direction from which the object must be grasped, with the only change required being the provision of jaws 50*a* having a suitable bidirectional claw 52*a* such as shown in FIG. 8. In such an embodiment, the length of threaded rod 20 required could alternatively be minimized by providing two different pivot points on the jaws, with the links 70 being selectively pivoted thereto depending on the orientation required to grasp the object to be removed.

Figure 10:
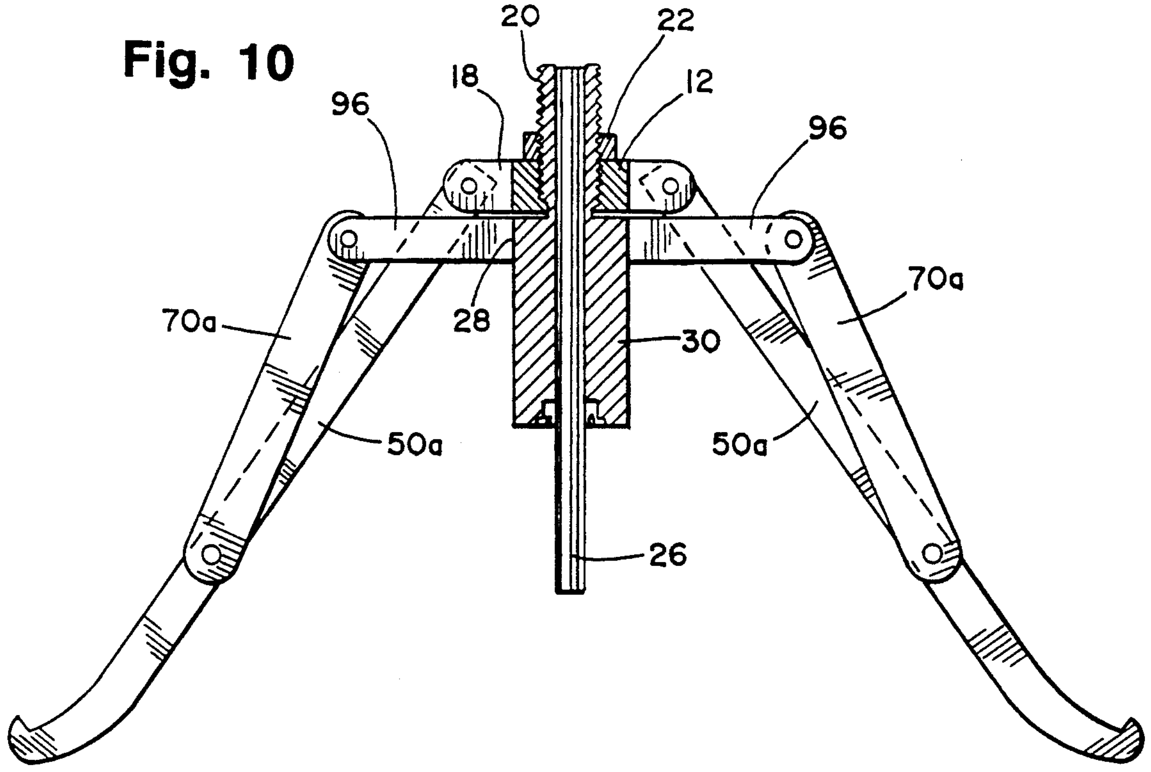
FIG. 10 is a cross-sectional view similar to FIG. 9 showing the puller in a radially outwardly expanded position for grasping an object on its inner periphery.

FIGS. 9-10 disclose a fourth embodiment of the invention having some clear similarities to the previously described embodiments. Therefore, in describing this embodiment, components which are the same as in the previously described embodiments are identified by the same reference numerals, and comparable but modified components are identified by the same reference numerals but with the letter "a" added in reference to the FIGS. 9-10 embodiment.

More specifically, as with the FIGS. 6-7 embodiment, the FIGS. 9-10 embodiment is usable to remove objects which must be grasped from their inner periphery for removal. Such operation is accomplished by providing radially projecting arms 96 from the top plate 28*a*, which arms 96 extend beyond the jaws 50*a* whereby the links 70*a* are oriented opposite their orientation in the FIGS. 1-3 embodiment. That is, the pivotal connection between the links 70*a* and the top plate arms 96 are disposed radially outwardly of the portion of the associated jaw 50*a* where the jaws 50*a* are axially aligned with the arm 96 and link 70*a* pivot. As a result of this orientation, the inwardly directed reactive force on the jaws 50*a* when grasping the inner periphery of an object applies a tension to the links 70*a*. As will be appreciated by those having an understanding of this art, it is generally easiest and least expensive to provide maximum strength by utilizing tensile strength (as opposed to bending or compressive strengths) for elongate links 70*a*.

The FIGS. 9-10 embodiment is shown with a hydraulic cylinder 30 drive, but it should be understood that this embodiment could, as well, be used with a manual drive such as shown in the FIGS. 4-7 embodiments.

It should thus now be apparent that pullers embodying the present invention may be easily and inexpensively manufactured, easily and inexpensively used, and easily and inexpensively repaired. Further, such pullers will operate reliably with minimal danger of injuring the operator, minimal risk of being damaging, and minimal risk of causing undesirable damage to the object being removed from the shaft.

Still further, pullers embodying the present invention provide significant operational advantages, as they maintain and even increase their grip on the object as it is removed from the shaft, and may be readily be used on a wide variety of objects—not only of different sizes but also those requiring grasping from different orientations (whether about their inner or outer peripheries).

Still other aspects, objects, and advantages of the present invention can be obtained from a study of the specification, the drawings, and the appended claims.

We claim:

1. A puller for removing an object from a shaft, comprising:

first and second collars;

first means for moving said collars relative to one another along an axis said first moving means permitting a limited selected amount of free movement of the second collar toward said first collar;

at least two circumferentially spaced clamping jaws pivotally supported at one end to said first collar and having means at the other end for grasping the object;

at least two circumferentially spaced links, each of said links being pivotally supported at one end to said second collar and pivotally supported at the other end to an associated clamping jaw; and second means for moving said second collar along said axis away from the shaft.

2. The puller of claim 1, wherein said first moving means is a nut threadedly connected to the second collar and secured to the first collar by a tongue and groove interconnection, said groove having an axial dimension greater than the axial dimension of the tongue by a selected amount to provide the limited amount of axial movement therebetween.

3. The puller of claim 2, wherein said the axial dimension of the groove is at least ⅛ inch greater than the axial dimension of the tongue.

4. The puller of claim 1, wherein the axial spacing between said first collar and said other end pivotal support of said links is greater than the axial spacing between said collars.

5. The puller of claim 1, wherein said first moving means comprises:

an axially extending threaded rod fixed to said second collar; and a nut receiving said threaded rod and secured against axial movement toward the shaft relative to said first collar, said nut being pivotal about said axis to move said threaded rod and second collar axially relative to said first collar.

6. The puller of claim 5, wherein said second moving means comprises:

an axially extending pusher secured to said second collar, said pusher having an end engageable with an end of the shaft; and means for driving said pusher against said shaft end to bias said second collar away from said shaft.

7. The puller of claim 6, wherein said driving means comprises:

a threaded surface about said pusher and received within a threaded opening fixed relative to said second collar; and an irregular surface about one end of said pusher, said surface being engageable by a tool for turning said pusher.

8. The puller of claim 1, wherein there are three clamping jaws having substantially 120 degree circumferential spacing therebetween.

9. A puller for removing an object from a shaft, comprising:

a first collar with an axially oriented central opening therethrough;

a threaded rod extending through said central opening;

a second collar secured to one end of said threaded shaft;

a nut adjustably disposed on said threaded rod, said first collar being disposed between said second collar and said nut and said nut being mounted to said first collar to permit a limited selected amount of axial movement therebetween;

first and second circumferentially spaced clamping jaws pivotally supported at one end to said first collar and having means at the other end for grasping the object;

first and second links supported at circumferentially spaced pivots on said second collar and pivotally supported at their other end to said first and second clamping jaws, respectively; and means for driving said collars axially away from the shaft.

10. The puller of claim 9, wherein said nut and first collar are connected by a tongue and groove, said groove having an axial dimension greater than the axial dimension of the tongue by a selected amount to provide the limited amount of free axial movement therebetween.

11. The puller of claim 10, wherein said the axial dimension of the groove is at least ⅛ inch greater than the axial dimension of the tongue.

12. The puller of claim 9, wherein said driving means comprises:

an axially extending pusher secured to one of said collars, said pusher having an end engageable with an end of the shaft; and means for driving said pusher relative to said second collar against said shaft end to bias said second collar away from said shaft end.

13. The puller of claim 9, wherein the axial spacing between said first collar and said other end pivotal support of said links is greater than the axial spacing between said collars.

14. The puller of claim 13, wherein said grasping means are directed radially inwardly toward said axis.

15. A puller for removing an object from about a shaft, comprising:

a first collar with an axially oriented central opening therethrough;

a threaded rod extending through said central opening;

a second collar secured to one end of said threaded shaft;

a nut adjustably disposed on said threaded rod, said first collar being disposed between said second collar and said nut, said nut being mounted to said first collar to permit a limited selected amount of axial movement therebetween;

a plurality of clamping jaws pivotally supported at one end to said first collar at substantially equal circumferential spacing around said collar central opening whereby said jaws pivot in planes which intersect at the axis of said first collar opening, said clamping jaws further having means at their other end for grasping the object;

a plurality of links pivotally supported at one end to said second collar at substantially equal circumferential spacing around said axis, said links each being pivotally supported at their other end to an associated one of said clamping jaws; and an axially extending pusher selectively biasing said second collar away from an end of the shaft to pull said clamping jaws and clamped object over said shaft.

16. The puller of claim 15, wherein the axial spacing between said first collar and said other end pivotal support of said links is greater than the axial spacing between said collars.

17. The puller of claim 16, wherein said grasping means are directed radially inwardly toward said axis.

18. The puller of claim 15, wherein said nut and first collar mounting is a tongue and groove interconnection, said groove having an axial dimension greater than the axial dimension of the tongue by a selected amount to provide the limited amount of axial movement therebetween.

19. The puller of claim 18, wherein said the axial dimension of the groove is at least 1 inch greater than the axial dimension of the tongue.

* * * * *